(12) United States Patent
Abbink et al.

(10) Patent No.: US 6,374,672 B1
(45) Date of Patent: Apr. 23, 2002

(54) SILICON GYRO WITH INTEGRATED DRIVING AND SENSING STRUCTURES

(75) Inventors: Henry C. Abbink, Thousand Oaks; Youngmin A. Choi, Agoura Hills, both of CA (US)

(73) Assignee: Litton Systems, Inc., Woodland Hills, CA (US)

( * ) Notice: Subject to any disclaimer, the term of this patent is extended or adjusted under 35 U.S.C. 154(b) by 7 days.

(21) Appl. No.: 09/627,549

(22) Filed: Jul. 28, 2000

(51) Int. Cl.[7] .................................................. G01P 9/04

(52) U.S. Cl. ..................................................... 73/504.12

(58) Field of Search .......................... 73/504.12, 504.08

(56) References Cited

U.S. PATENT DOCUMENTS 5,987,986 A * 11/1999 Wyse et al. .............. 73/504.12
6,308,567 B1 * 10/2001 Higuchi et al. .......... 73/504.12

* cited by examiner

Primary Examiner—Richard A. Moller
(74) Attorney, Agent, or Firm—Elliott N. Kramsky

(57) ABSTRACT

A rotation sensor is formed of three semiconductor wafers. A first wafer comprises a frame that surrounds a paddle. The rotation-sensitive paddle is surrounded on either of the opposed sides of the first wafer by rings of driven elements formed of radially-directed plateaus in the semiconductor material. Second and third wafers sandwich the first wafer. Each of the second and third wafers includes a first surface in which are formed concentric rings of driver and pickoff electrodes. In a preferred embodiment, the rings of pickoff electrodes are split into two semicircular arcs.

21 Claims, 6 Drawing Sheets

SILICON GYRO WITH INTEGRATED DRIVING AND SENSING STRUCTURES

BACKGROUND

1. Field of the Invention:

The present invention relates to silicon gyros of the type in which rotation rate is measured by the Coriolis effect-induced deflection of a sensor element that includes a paddle that is supported by aligned flexures defining an axis of rotation. In particular, the present invention pertains to such a device that includes wafer elements which integrate driving and sensing functions.

2. Description of the Prior Art

Precision micro-mechanical devices have wide application in the fields of inertial navigation and guidance with respect to both long-range, re-usable vehicles, such as aircraft, and relatively short-range, one-use vehicles, such as munitions. Such devices may be employed to measure acceleration directly and rotation rate indirectly through the Coriolis principle. According to that principle, a body traveling at a velocity $\overline{V}$ in a coordinate frame which is subject to rotation $\overline{\Omega}$ experiences an acceleration $\overline{A}_c$ defined as the cross product $\overline{A}_c = 2\overline{\Omega} \times \overline{V}$. By imposing a sinusoidal relative velocity of the form:

$$\overline{V} = \overline{V}_o \sin \omega t$$

The corresponding Coriolis acceleration then becomes:

$$\overline{A}_c = 2\overline{\Omega} \times \overline{V}_o \sin \omega t$$

The measurement of rotation rate is obtained by determining the resultant sinusoidal Coriolis force exerted upon a deflectable force sensitive member.

Micromechanical devices are well suited for operation in low cost systems due to the compactness, simplicity and batch processing capabilities that they offer. One type of micromechanical inertial sensor employs a paddle that is rotatable about an axis defined by aligned flexure beams that support it with respect to a counter-oscillating hub (rotation rate sensor element). Pending U.S. patent application Ser. No. 09/127,375 of inventor Stanley F. Wyse entitled "Micromachined Rotation Sensor with Modular Sensor Elements" and 08/903,499 of Robert E. Stewart and Stanlet F. Wyse entitled "Navigation Grade Micromachined Rotation Sensor System" disclose inertial sensors of the foregoing type.

Devices of the above-identified type typically comprise stacks of silicon wafers. One of such wafers, known as a driver wafer, includes a plurality of radially-directed electrodes formed upon one or both of its opposed surfaces. A second wafer includes a plurality of radially-directed electrodes formed upon a facing surface in an assembled device. In some embodiments, this wafer is known as a driven wafer. The electrodes of the driven wafer are offset from those of the driver wafer (which is mounted to the case that surrounds the sensor) so that, upon energization, the driven element will be caused to oscillate in response to an a.c. voltage signal applied to the driver electrodes. A sensor wafer that includes the paddle is fixed to the driven wafer in such a way that the paddle is caused to oscillate at the chosen dither frequency causing out-of-plane oscillations of the paddle with respect to the sensor wafer. Such out-of-plane oscillations of the paddle are detected to provide the Coriolis acceleration that is readily converted to rotation rate.

As an alternative, the above patent applications also teach arrangements employing a pair of driver wafers, each having a set of radially-directed electrodes on facing surfaces offset from one another.

Additional electrodes are provided for torquing and picking-off the rotation of the paddle about the axis formed by aligned central flexure beams. In pending patent application 09/127,375, such electrodes are fixed to cover wafers adjacent opposed surfaces of the sensor wafer.

FIG. 1 is a side elevation view in cross-section of a device in accordance with the above-described prior art. As can be seen, the device comprises a sensor stack 10 comprising a top cover wafer 12 having vias 14 and 16 defined therein for contacting electrodes 18 and 20 respectively of an electrode layer 22 that includes a surrounding guard ring 24. The wafers 12 and 22 are fusion-bonded to one another at an oxide layer 26. A bottom cover wafer 28 is configured similar to the top cover wafer 12 and is indirectly fusion-bonded to a lower electrode wafer 30 at an oxide layer 32 to form a like structure.

A sensing element wafer 34 is etched to define a sensing paddle 36 that is supported by aligned flexure beams (one of which is shown at 38) for joining it to a surrounding frame 40. Overlying and underlying oxide layers 42 and 44 respectively are provided for fusion-bonding of the opposed surfaces of the sensing element wafer 34 to the above-described structures.

The above-described sensor stack 10 is fusion-bonded to a dither drive stack 46 at an oxide layer 48. The dither drive stack 46 consists of a driver wafer 50 which, as described above, includes a plurality of radially-arranged electrodes 51 at its top surface, and a driven element wafer 52 that is indirectly fusion-bonded to (a hub of) the driver wafer 50 at an oxide layer 54. The driven wafer 52 includes a set of radially-arrayed electrodes 55 fixed to its lower surface that faces the set of offset electrodes fixed to the top surface of the driver wafer 50. The wafer 52 includes a central hub 56 that is fusion bonded to the driver wafer 50 and an outer member 58 that is bonded to the bottom cover wafer 28 and joined to the hub 56 by reduced thickness flexure beams 60 and 62.

In operation, the sensor stack 10 is dithered at about 2 kHz about a vertical axis 64. The driver wafer 50 is stationary, as is the hub 56 of the driven wafer 52. The outer portion 58 of the driven wafer 52, supported by the flexure beams 60 and 62, is free to oscillate. Electrostatic torquing is provided by interaction of the sets of offset (by 1/4 cycle) electrodes 51, 55.

The device illustrated in FIG. 1, which requires a high vacuum environment to run at high Q, is assembled by bonding the sensor stack 10 to the dither stack 46. This is done by carefully wicking-in EPOXY or like adhesive. Unfortunately, EPOXY outgassing can degrade the quality of the vacuum and, thus, the Q of the device.

As can be seen in FIG. 1 the gap between the driven wafer 52 and the driver wafer 50 extends to the edges of the chips. Such a structure necessitates the use of special and costly dicing techniques to prevent breakage of the dither beams 60 and 62 during manufacture as well as requiring special techniques to keep particles out of the gap as electrostatic forces make the gap attractive to particles that can interfere with dither motion, generate noise and, in most cases, prevent it altogether.

The prior art device requires five (5) silicon wafers, eighteen (18) different masks and the routing of wires from the bottom of the sensor stack 10 through grooves (not shown) in the driven wafer 52. Accordingly, assembly is very time consuming, requiring a degree of hand skill unsuitable for large scale production.

SUMMARY OF THE INVENTION

The preceding and other disadvantages of the prior art are addressed by the present invention that provides a rotation sensor. In a first aspect, such sensor includes a first generally-planar wafer that includes a paddle and a plurality of driven elements defined at its opposed sides. A second generally-planar wafer has a plurality of driver electrodes defined on a first surface and a third generally-planar wafer has a plurality of driver electrodes defined on a first surface. The first wafer is arranged relative to the second and third wafers so that the first surfaces of the second and third wafers face the opposed surfaces of said first wafer. A first pair of electrodes is defined on the first surface of the second wafer and is substantially aligned with the paddle. A second pair of electrodes is defined on the first surface of the third wafer and is substantially aligned with the paddle.

In a second aspect, the invention provides a rotation sensor that includes a first generally-planar silicon wafer that comprises a frame surrounding a substantially-round paddle. The first wafer further includes a plurality of driven elements defined at its opposed sides. A second generally-planar silicon wafer has a plurality of driver electrodes defined on a first surface. A third generally-planar silicon wafer has a plurality of driver electrodes defined on a first surface. The first wafer is arranged with respect to the second and third wafers so that the first surfaces of the second and third wafers face the opposed surfaces of the first wafer. A first pair of electrodes is defined on the first surface of the second wafer substantially aligned with the paddle and a second pair of electrodes is defined on the first surface of the third wafer substantially aligned with the paddle.

The preceding and other features and advantages of this invention shall become apparent from the detailed description that follows. Such written description is accompanied by a set of drawing figures. Numerals of the drawing figures, corresponding to those of the written description, point to the features of the invention. Like numerals refer to like features of the invention throughout both the drawing figures and the written description.

DETAILED DESCRIPTION OF THE PREFERRED EMBODIMENT

The present invention achieves an improved silicon gyro configuration through the use of integrated component wafers that redistribute device functions in such a way that the resultant overall sensor structure achieves numerous advantages over the prior art.

Figure 1:
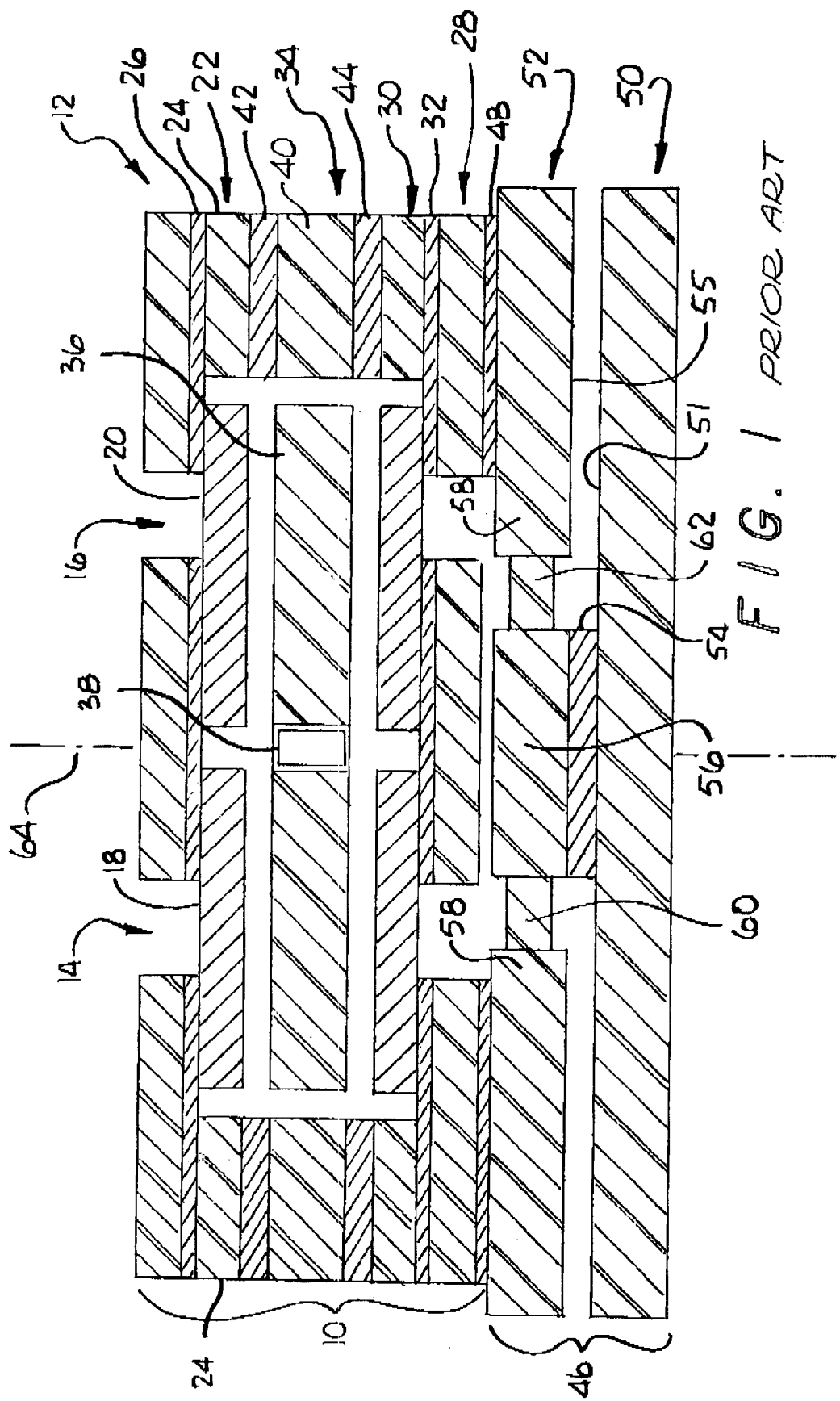
FIG. 1 is a side view in cross-section of an angular rate-of-rotation sensor in accordance with the prior art.
Figure 2:
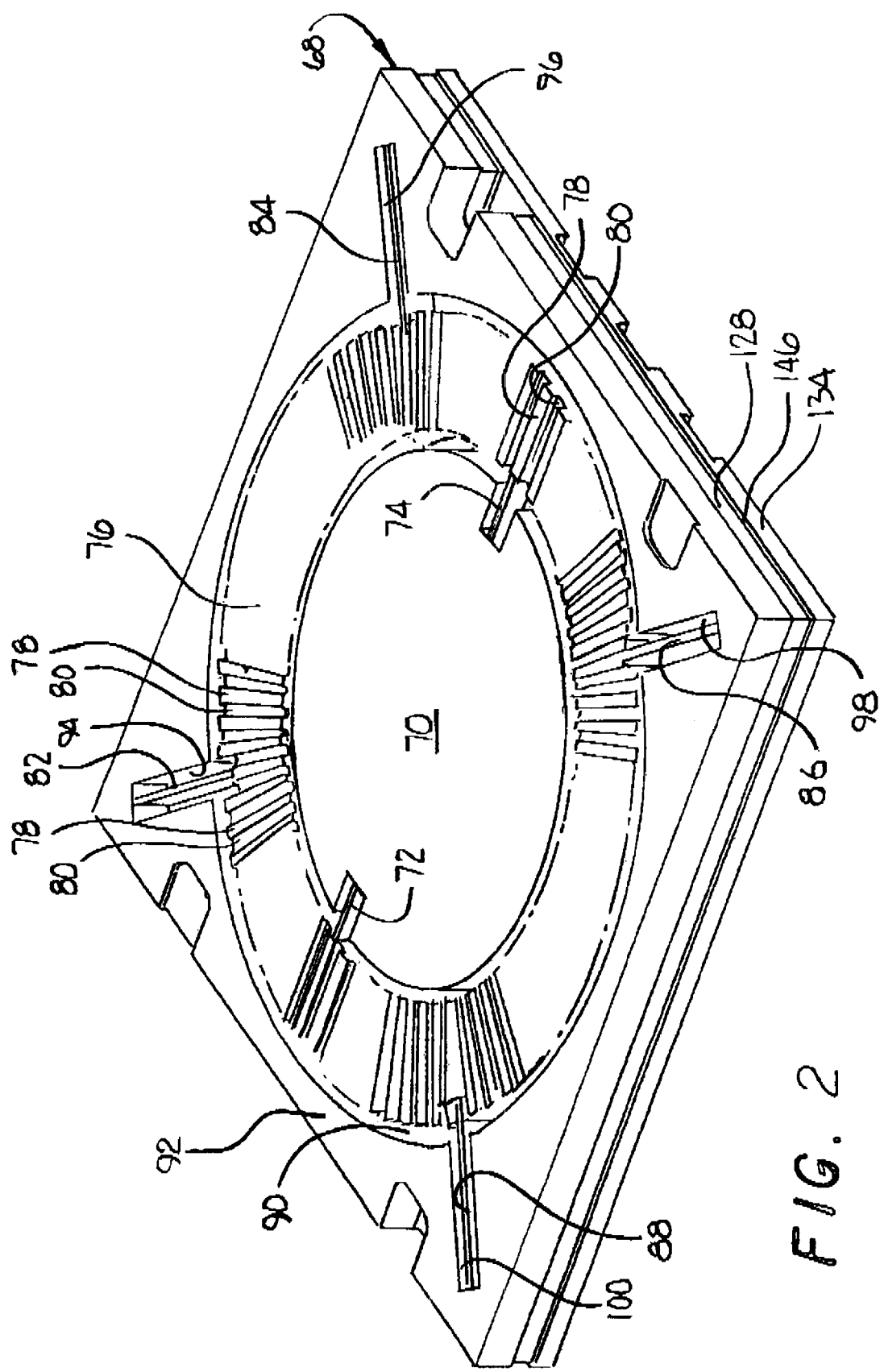
FIG. 2 is a perspective view of a wafer for use in an angular rate-of-rotation sensor in accordance with the invention that integrates the sensor paddle with a driven element.

Referring initially to a first integrated element of the sensor, FIG. 2 is a perspective view of a wafer invention that integrates the sensing paddle with a driven element. This allocation of functions to a single wafer is to be contrasted with the prior art as illustrated in FIG. 1 in which the paddle 36 is formed in a sensing element wafer 34 that is separate from the driven wafer 52. The integrated driven wafer 68 of the invention comprises a substantially-planar silicon structure combining the two functions, ultimately resulting in a reduction in the number of wafers and the attendant fabrication processes required to produce a complete sensor.

The wafer 68 is etched to define a central paddle 70 that is supported by an aligned pair of inner beams 72 and 74 defining an axis of rotation (deflection) of the paddle 70 in response to an input Coriolis acceleration force. Each of the inner beams 72 and 74 is of sufficiently greater height than thickness to present an aspect ratio (in cross-section) of adequate stiffness to prevent any out-of-plane sagging of the paddle 70 to thereby assure a reliable null default position.

An annular driven ring 76 includes a plurality of radially-directed plateaus 78 that surround the paddle 70. The plateaus 78, which function as driven electrodes, are defined by and interspersed with radially-etched regions 80. The integrated driven wafer 68 is double-sided with an identical, mirror-image electrode configuration formed on its obverse surface (not visible in FIG. 2).

The annular driven ring 76 is joined to the paddle 70 at its inner circumference by the inner beams 72 and 74 and is supported at its outer circumference by radially-extending outer beams 82, 84, 86 and 88. The outer beams 82 through 88 are regularly-spaced with beam pairs 82, 86 and 84, 88 radially aligned with one another and, as illustrated, offset by 45 degrees from the axis of rotation defined by the inner beams 72, 74. (Note: The offset is not essential to gyro operation.) The outer beams 82 through 88, each of significantly greater length than an inner beam, function as flexible webs for supporting, yet allowing angular displacement of, the annular driven ring 76. The shorter inner beams 72, 74, while subject to axial twisting, maintain alignment to define the axis of rotation of the paddle 70.

As in the case of the inner beams 72 and 74, the outer beams 82 through 88 are each of sufficiently greater height than thickness to provide the stiffness to support the combination of the paddle 70 and the driven ring 76 within a central circular aperture 90 of an outer frame 92 without sag. Radially-directed cavities 94, 96, 98 and 100 of the outer frame 92 provide clearance for the outer beams, allowing each of the beams to be of sufficient length (in contrast to the relatively-short inner beams 72 and 74) to permit the necessary degree of deflection (within the plane of the wafer 68) to oscillate the driven ring 76 and paddle 70 in response to electrostatic forces generated between the driven ring 76 and an annular driver (discussed below).

Figure 3:
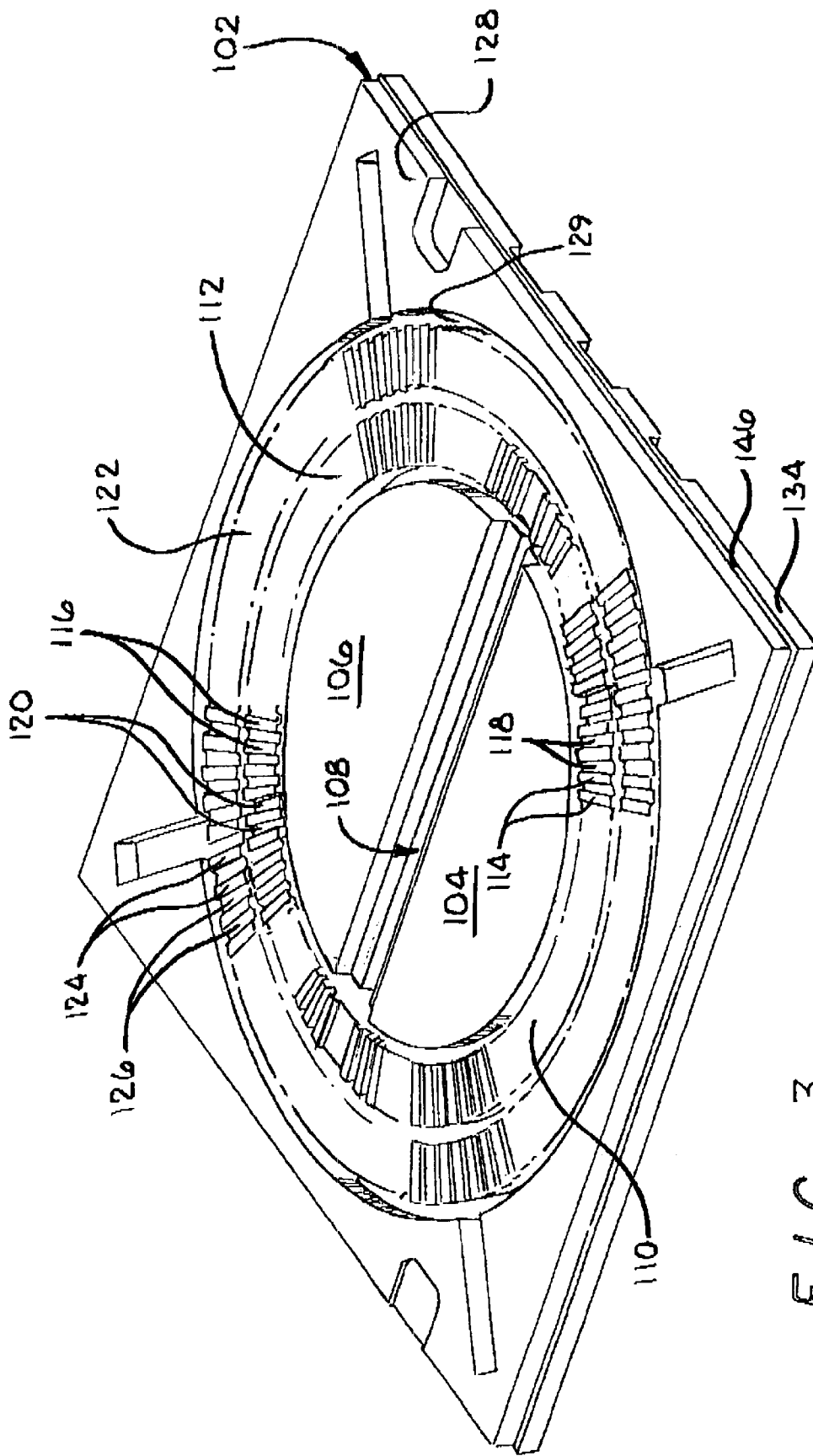
FIG. 3 is a perspective view of a wafer for use in an angular rate-of-rotation sensor in accordance with the invention that integrates driver, forcer-pickoff and driven pickoff electrodes.

FIG. 3 is a perspective view of a second building block of the invention, namely, a wafer 102 that integrates the functions of driver, forcer-pickoff, and driven pickoff electrodes. The integrated driver wafer 102 is etched to form six (6) disconnected and, therefore, electrically insulated sections. It includes centrally-located arcuate electrodes 104 and 106 that interact with the paddle 70 of the integrated driven wafer 68 for driving, picking-off and tuning the oscillatory deflections of the paddle 70 that result from Coriolis forces.

Surrounding the arcuate central electrodes 104 and 106 (which are separated from one another by a separation distance indicated at 108) is a split annular member comprising end-to-end first and second semi-annular pickoffs 110 and 112. Each of the pickoffs 110, 112 comprises a plurality of radially-directed electrode plateaus 114 and 116 respectively. The plateaus 114, 116 are defined by pluralities of radially-etched areas 118, 120 of the integrated driver wafer 102. The pluralities of plateau electrodes 114 and 116 of the semi-annular pickoffs 110, 112 are equal in number to the radially-directed electrodes 78 of the annular driven ring 76 and are provided for detecting the amplitude of the oscillations of the driven ring 76 within the plane of the integrated driven wafer 68.

While the invention as illustrated in this figure includes a split ring pickoff electrode configuration, it is also operable with pickoff electrodes arranged into a continuous ring. The arrangement and operation of each of such pickoff electrode configurations is illustrated and discussed with references to FIGS. 5(a) and 5(b) below.

Returning to FIG. 3, an annular driver 122 encircles the paired semi-annular pickoffs 110 and 112. Just as in the situation of the pickoffs, the annular driver 122 includes a plurality of radially-directed electrode plateaus 124 defined by a plurality of radially-etched regions 126 of the integrated driver wafer 102. The electrodes 124 are again equal in number to those of the annular driven ring 76 of the wafer 68 and comprise an element of the circuitry for controlling the amplitude of oscillation of the driven ring. As discussed below, the electrodes of the driven ring, driver and pickoffs are regularly offset from one another by specific, predetermined amounts to assure that the required signals and rebalance forces can be generated for controlling the oscillation amplitude of the driven ring 76. The various electrode structures of the wafer 102 are contained within an outer frame 128 having a circular internal aperture 129.

Unlike the integral driven wafer 68, the electrodes of the semi-annular pickoffs 110, 112 and the driver ring 122 are formed on only a single surface of the wafer 102. This will be seen to necessitate that a pair (top and bottom) of integrated driver wafers 102 be employed for interacting with a single annular driven ring 76 in a complete rotation sensor in accordance with the invention.

Figure 4:
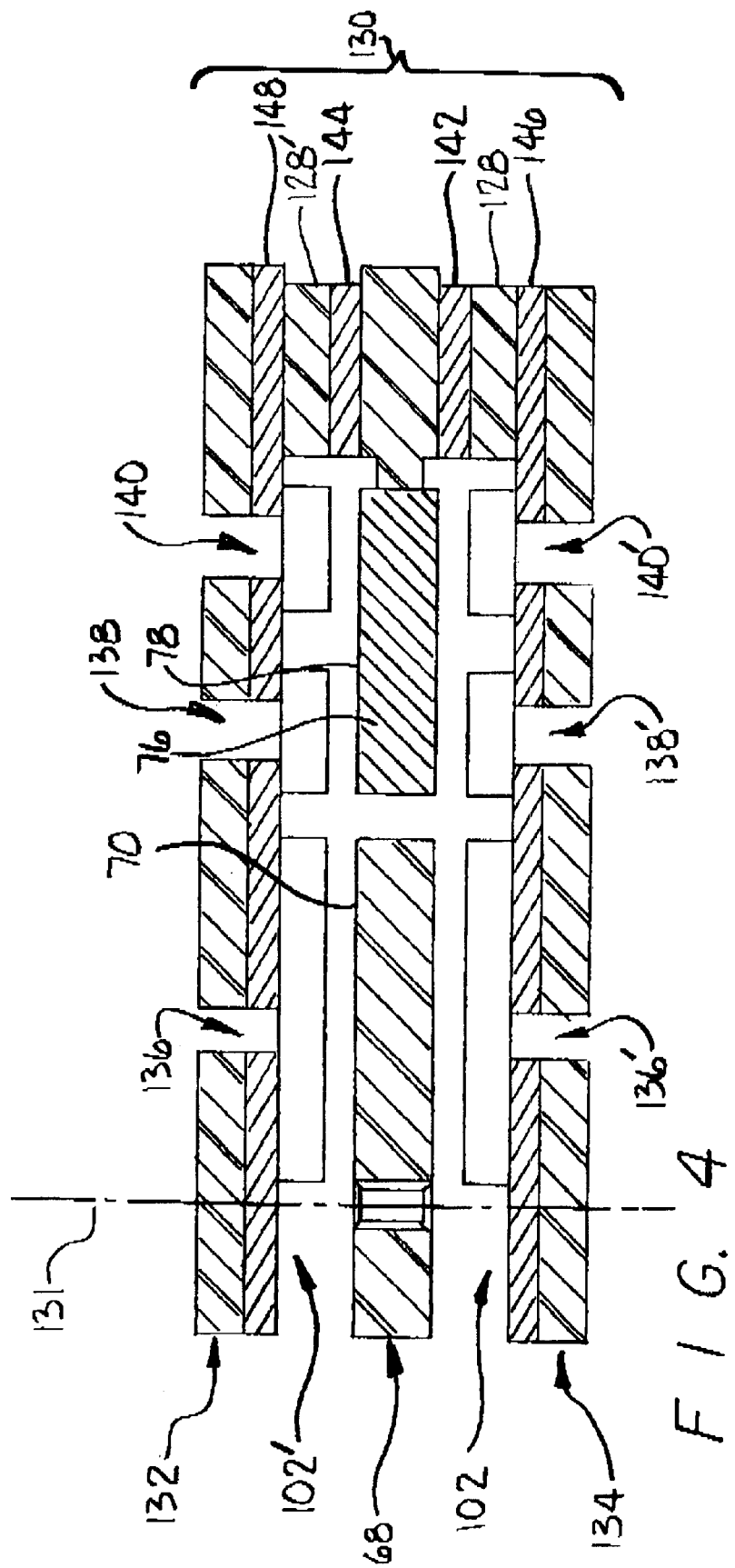
FIG. 4 is a somewhat schematic side elevation view in cross-section of an angular rate-of-rotation sensor in accordance with the invention.

FIG. 4 is a somewhat schematic side elevation view in cross section of an annular rate-of-rotation sensor 130 in accordance with the invention. The device has been truncated somewhat to the left of an axis of oscillation 131 as the sensor 130 is symmetrical about such axis. An upper cover 132 and a lower cover 134 sandwich the wafers that contain the functional elements of the rotation sensor 130. As a first observation, the functions of the rotation sensor 130 are integrated onto three wafers, the integrated driven wafer 68, the lower driver wafer 102 and an upper driver wafer 102'. (Note: prime numerals are employed to indicate elements of the upper driver wafer 102' that correspond to like elements of the lower driver wafer 102, it being understood that each of the wafers 102 and 102' is oriented so that its electrodes face inwardly to interact with the paddle 70 and with the driven electrodes 78.) Apertures 136, 138 and 140 are provided in the upper cover 132 for conductor access while like apertures 136', 138' and 140' are provided in the lower cover 134'.

The sensor 130 of FIG. 4, which does not include separate sensor and driver stacks, may be assembled without organic adhesive and attendant risk of outgassing that may ultimately degrade the Q of the device. In the sensor 130, the integrated driven wafer 68 is fusion bonded to the lower and upper driver wafers 102, 102' via oxide layers 142 and 144 respectively and the lower and upper driver wafers 102, 102' are, in turn, fusion bonded to the lower and upper covers 134, 132 via oxide layers 146 and 148. Alternatively, the sensor 130 can be fabricated from SOI wafers with such wafers forming upper and lower cover-and-driver wafer structures that can be fusion-bonded to opposed sides of the integrated driven wafer 68. Such alternative is made possible by the fact that the electrodes of the lower and upper driver wafers 102 and 102' each face inwardly and away from the oxide layers 146 and 148.

By comparing the sensor 130 to the prior art device of FIG. 1, it may be noted that the invention includes no edge gap, eliminating any need for special and costly dicing techniques to prevent breakage. Furthermore, because of the absence of an open gap, one needn't deal with problems posed by electrostatic forces attracting minute particles during dicing.

Furthermore, as the functional elements are now integrated onto only three wafers, the sensor 130 represents a significant material saving as well as a simplification of the fabrication process.

Figure 5A:
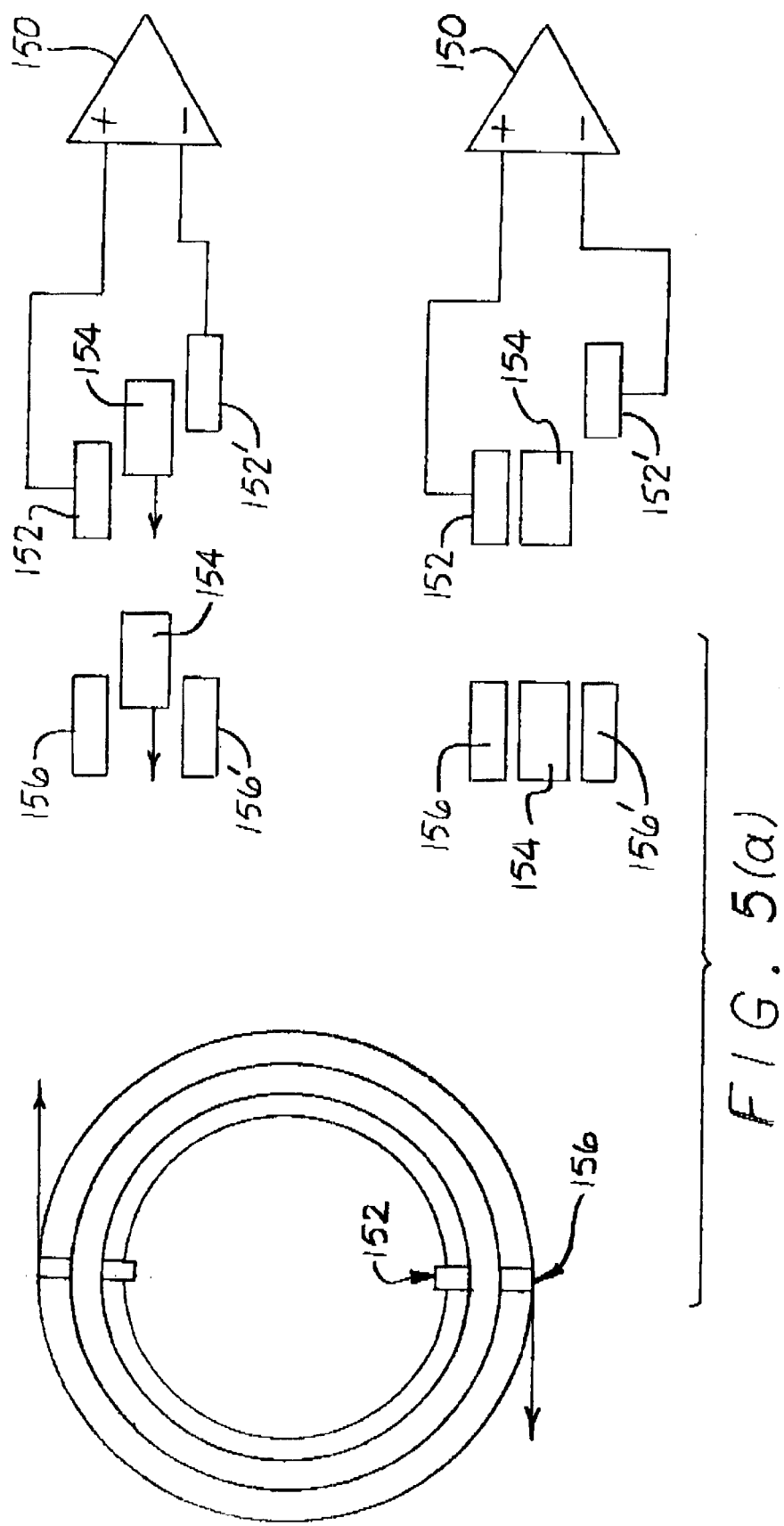
FIGS. 5(a) and 5(b) are schematic views for illustrating the operation of the pickoff apparatus of the invention employing a continuous and a split ring of pickoff electrodes, respectively.
Figure 5B:
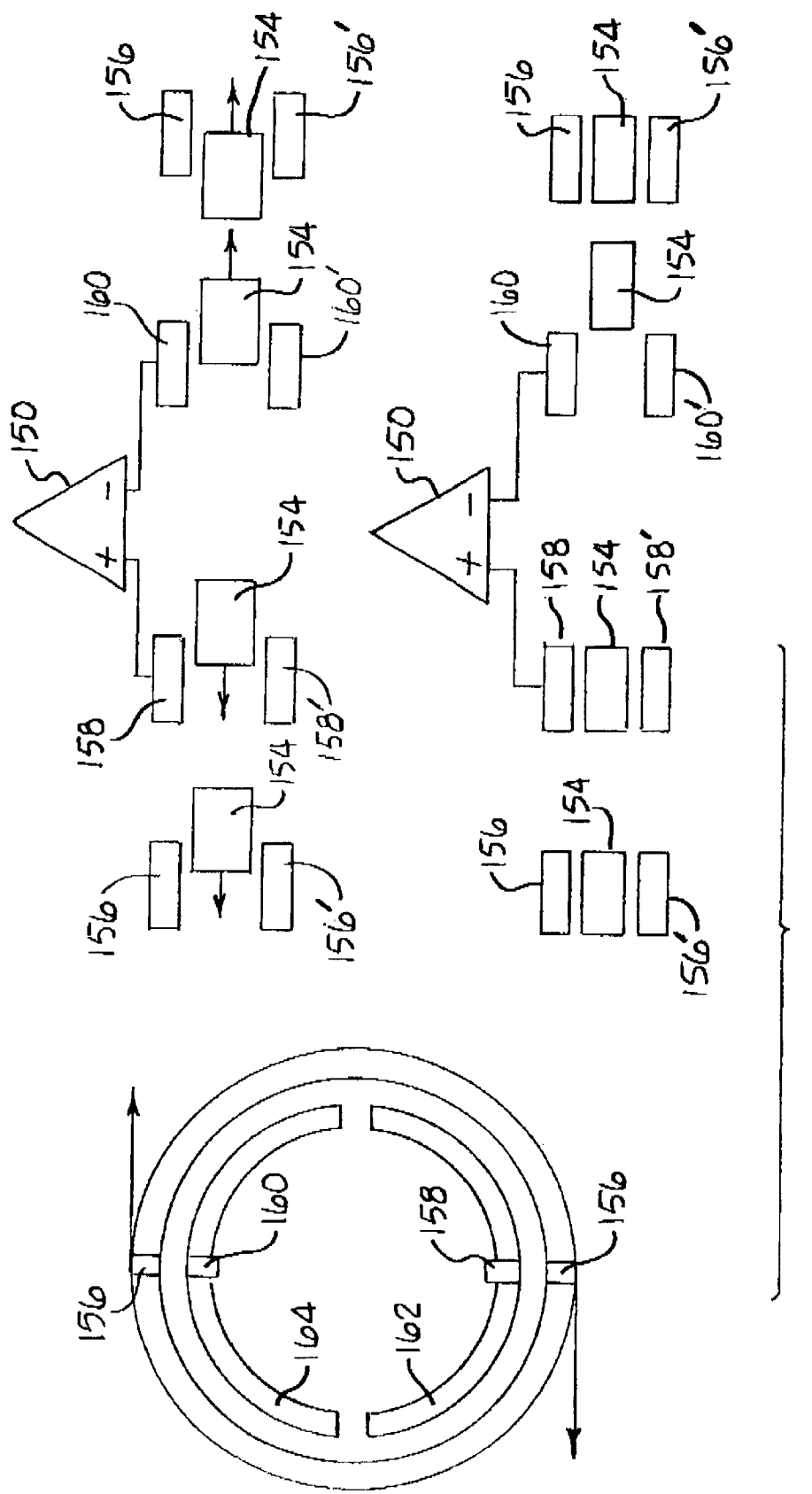

FIGS. 5(a) and 5(b) illustrate the arrangement and operation of the invention with dither pickoff in accordance with a continuous and a split ring of pickoff electrodes, respectively. It will be recalled that the split ring configuration has already been illustrated (FIG. 3). In either case, the pickoff electrodes of the sensor 130 are formed onto facing surfaces of the integrated driver wafers 102 and 102' with each set of pickoff electrodes facing one of the opposed surfaces of the integrated driven wafer 68.

In FIG. 5(a) the upper arrangement of electrodes represents the sensor at rest position and the lower arrangement of electrodes represents the sensor at maximum deflection pursuant to the interaction of offset driver and driven electrode rings. The continuous pickoff ring arrangement advantageously requires the use of only a pair of pickoff leads. This simplifies assembly and adds to device reliability versus a split pickoff ring arrangement which requires the affixation of a total of four pickoff leads.

A differential amplifier 150 receives outputs from a top pickoff electrode 152 and a bottom pickoff electrode 152' of continuous top and bottom pickoff rings respectively. Due to the differential operation of the pickoff electronics, the electrodes of the top pickoff ring must be offset by 180 degrees from those of the bottom pickoff ring so that displacement of the electrodes 156 of the driven ring may be detected and a pickoff signal generated.

As can be seen in the lower arrangement of electrodes of the various electrode rings at maximum deflection, the offsetting of the top and bottom pickoff electrodes 152 and 152' results in the simultaneous total alignment of the top pickoff electrodes 152 and complete misalignment of the bottom pickoff electrodes 152' with the driven electrodes 154. This can produce a situation known as "pumping" due to the electrostatic imbalance thereby created. Such an effect can introduce a small amount of deflection and vibration that must be accounted for in the design of the sensor and/or in the measurement of device output.

One method for overcoming the pumping problem is the split ring arrangement of pickoff electrodes, the operation of which is illustrated in FIG. 5(b). Again a differential amplifier 150 receives the outputs from the pickoff electrodes. However, in contrast to the previously discussed arrangement, the differential amplifier 150 now receives, as inputs, the charges at front and back electrodes 158 and 160 of the semicircular segments 162 and 164 respectively that comprise the split pickoff of the top integrated driver wafer.

The upper right hand portion of FIG. 5(b) illustrates the relative positions of the relevant electrodes at rest (i.e. without any displacement of the electrodes 154 of the integrated driven wafer. As can be seen, the relationship between the driven electrodes 154 and the front pickoff electrodes 158, 158' of the top and bottom front pickoff rings 162 and 162' is precisely 180 degrees out of phase with respect to that between the driven electrodes 154 and the back pickoff electrodes 160, 160' of the top and bottom back pickoff rings 164 and 164'.

The relationship between the various electrodes at maximum deflection of the integrated driven wafer is illustrated at the lower right hand portion of FIG. 5(b). As can be seen, upon maximum deflection, the electrodes 158 and 158' of the top and bottom front pickoff ring segments 162 and 162' respectively are now aligned with the driven electrodes 154. At the same time, the electrodes 160 and 160' of the top and bottom back pickoff ring segments 164 and 164' are 360 degrees out of phase with the driven electrodes 154. This assymetry enables the measurement of dither magnitude at the differential amplifier 150, In contrast to the previously-described arrangement, the use of a split ring of pickoff electrodes eliminates any need to misalign the pickoff electrodes of the top integrated driver wafer from those of the bottom integrated driver wafer. The maintenance of such symmetry avoids any pumping effect as the force exerted upon the integrated driven wafer by the charges stored upon pickoff electrodes of the top and bottom integrated driver wafers are the same.

While this invention has been illustrated with regard to its presently-preferred embodiment, it is not limited thereto. Rather, the invention is limited only insofar as it is defined by the following set of patent claims and includes within its scope all equivalents thereof.

What is claimed is:

1. A rotation sensor comprising, in combination:
   a) a first generally-planar wafer including a paddle;
   b) said first wafer further including a plurality of driven elements defined at its opposed sides;
   c) a second generally-planar wafer, said wafer having a plurality of driver electrodes defined on a first surface thereof;
   d) a third generally-planar wafer, said wafer having a plurality driver electrodes defined on a first surface thereof;
   e) said first wafer being arranged relative to said second and third wafers so that said first surfaces of said second and third wafers face said opposed surfaces of said first wafer;
   f) a first pair of electrodes defined on said first surface of said second wafer and substantially aligned with said paddle; and
   g) a second pair of electrodes defined on said first surface of said third wafer and substantially aligned with said paddle.

2. A rotation sensor as defined in claim 1 further characterized in that:
   a) said driven elements comprise radially-directed plateaus defined within said opposed surfaces of said first wafer; and
   b) said driver electrodes comprise radially-directed plateaus formed within said first surfaces of said second and third wafers.

3. A rotation sensor as defined in claim 2 further characterized in that:
   a) said driven elements are arranged into rings formed on said opposed surfaces of said first wafer;
   b) said driver electrodes are arranged into rings on said first surfaces of said second and third wafers; and
   c) said rings substantially overlap one another.

4. A rotation sensor as defined in claim 3 further characterized in that:
   a) said paddle is substantially round; and
   b) said paddle is located interior to said rings of driven elements.

5. A rotation sensor as defined in claim 4 wherein said first wafer further comprises:
   a) a peripheral frame;
   b) a plurality of radially-directed beams extending inwardly from said frame to and supporting said rings of driven elements; and
   c) at least one pair of aligned torsion bars extending inwardly from said rings of driven elements to and supporting said paddled.

6. A rotation sensor as defined in claim 5 further including:
   a) a plurality of pickoff electrodes formed in said first surfaces of said second and third wafers;
   b) said pickoff electrodes comprising radially-directed plateaus formed in said first surfaces of said second and third wafers;
   c) said plateaus of pickoff electrodes being formed into rings on said first surfaces of said second and third wafers; and
   d) each of said rings of pickoff electrodes being concentric with a ring of driver electrodes.

7. A rotation sensor as defined in claim 6 wherein said pickoff electrode rings are electrically insulated from said driver electrode rings.

8. A rotation sensor as defined in claim 7 wherein:
   a) each of said rings of pickoff electrodes comprises a pair of semicircular rings; and
   b) said semicircular rings are electrically insulated from one another.

9. A rotation sensor as defined in claim 3 further characterized in that:
   a) the number of driver electrodes is equal to the number of facing driven elements; and
   b) each of said driven elements is offset by an equal amount from each of said driver electrodes at null.

10. A rotation sensor as defined in claim 9 wherein each of said driven elements is offset by 180 degrees from the facing driver electrode at null.

11. A rotation sensor as defined in claim 1 further characterized in that:
   a) said first pair of electrodes comprises two metallized arcuate sections; and
   b) said second pair of electrodes comprises two metallized arcuate sections.

12. A rotation sensor as defined in claim 3 wherein:
   a) said first pair of electrodes lies within said rings of driver electrodes formed on said first surface of said second wafer; and
   b) said second pair of electrodes lies within said rings of driver electrodes formed on said first surface of said third wafer.

13. A rotation sensor as defined in claim 6 wherein:
   a) said rings of pickoff electrodes in said first surface of said second wafer lies within said rings of driver electrodes in said first surface of said second wafer; and
   b) said rings of pickoff electrodes in said first surface of said third wafer lies within said rings of driver electrodes within said first surface of said third wafer.

14. A rotation sensor comprising, in combination:
a) a first generally-planar silicon wafer comprising a frame surrounding a substantially-round paddle;
b) said first wafer further including a plurality of driven elements defined at its opposed sides;
c) a second generally-planar silicon wafer, said wafer having a plurality of driver electrodes defined on a first surface thereof;
d) a third generally-planar silicon wafer, said wafer having a plurality driver electrodes defined on a first surface thereof;
e) said first wafer being arranged with respect to said second and third wafers so that said first surfaces of said second and third wafers face said opposed surfaces of said first wafer;
f) a first pair of electrodes defined on said first surface of said second wafer and substantially aligned with said paddle; and
g) a second pair of electrodes defined on said first surface of said third wafer and substantially aligned with said paddle.

15. A rotation sensor as defined in claim 14 further characterized in that:
a) said driven elements comprise radially-directed plateaus defined within said opposed surfaces of said first wafer; and
b) said driver electrodes comprise radially-directed plateaus formed within said first surfaces of said second and third wafers.

16. A rotation sensor as defined in claim 15 further characterized in that:
a) said driven elements are arranged into rings formed on said opposed surfaces of said first wafer;
b) said driver electrodes are arranged into rings on said first surfaces of said second and third wafers; and
c) said rings substantially overlap one another.

17. A rotation sensor as defined in claim 16 further including:
a) a plurality of pickoff electrodes formed in said first surfaces of said second and third wafers;
b) said pickoff electrodes comprising radially-directed plateaus formed in said first surfaces of said second and third wafers;
c) said plateaus of pickoff electrodes being formed into rings on said first surfaces of said second and third wafers; and
d) each of said rings of pickoff electrodes being concentric with a ring of driver electrodes.

18. A rotation sensor as defined in claim 17 wherein said pickoff electrode rings are electrically insulated from said driver electrode rings.

19. A rotation sensor as defined in claim 18 wherein:
a) each of said rings of pickoff electrodes comprises a pair of semicircular rings; and
b) said semicircular rings are electrically insulated from one another.

20. A rotation sensor as defined in claim 16 further characterized in that:
a) the number of driver electrodes is equal to the number of facing driven elements; and
b) each of said driven elements is offset by an equal amount from each of said driver electrodes at null.

21. A rotation sensor as defined in claim 20 wherein each of said driven elements is offset by 180 degrees from the facing driver electrode at null.

* * * * *